United States Patent
Toqan et al.

(10) Patent No.: US 9,181,812 B1
(45) Date of Patent: *Nov. 10, 2015

(54) CAN-ANNULAR COMBUSTOR WITH PREMIXED TANGENTIAL FUEL-AIR NOZZLES FOR USE ON GAS TURBINE ENGINES

(76) Inventors: Majed Toqan, Abu Dhabi (AE); Brent Allan Gregory, Scottsdale, AZ (US); Jonathan David Regele, Fountain Hills, AZ (US); Ryan Sadao Yamane, Gilbert, AZ (US)

(*) Notice: Subject to any disclaimer, the term of this patent is extended or adjusted under 35 U.S.C. 154(b) by 1215 days.

This patent is subject to a terminal disclaimer.

(21) Appl. No.: 12/772,398

(22) Filed: May 3, 2010

Related U.S. Application Data

(60) Provisional application No. 61/175,544, filed on May 5, 2009.

(51) Int. Cl.
  F01D 9/02 (2006.01)
  F23R 3/34 (2006.01)
  F02C 3/34 (2006.01)
  F23R 3/28 (2006.01)
  F23C 6/04 (2006.01)

(52) U.S. Cl.
  CPC F01D 9/02 (2013.01); F01D 9/023 (2013.01); F02C 3/34 (2013.01); F23R 3/286 (2013.01); F23R 3/34 (2013.01); F23C 6/045 (2013.01)

(58) Field of Classification Search
  CPC ............ F01D 9/023; F23R 3/34; F23R 3/286; F02C 3/34; F23C 6/045
  USPC ........ 60/39.37, 732–734, 737, 738, 746, 750, 60/752–760
  See application file for complete search history.

(56) References Cited

U.S. PATENT DOCUMENTS

| | | | | |
|---|---|---|---|---|
| 2,676,460 A | * | 4/1954 | Brown | 60/742 |
| 2,883,828 A | * | 4/1959 | Howell | 60/246 |
| 3,238,718 A | * | 3/1966 | Hill | 60/39.37 |
| 3,498,055 A | * | 3/1970 | Faitani et al. | 60/776 |
| 3,657,885 A | * | 4/1972 | Bader | 60/737 |
| 3,811,277 A | * | 5/1974 | Markowski | 60/733 |
| 3,880,575 A | * | 4/1975 | Cross et al. | 431/353 |
| 3,934,408 A | * | 1/1976 | Irwin | 60/753 |
| 4,265,085 A | * | 5/1981 | Fox et al. | 60/776 |
| 4,891,936 A | * | 1/1990 | Shekleton et al. | 60/804 |
| 4,928,479 A | * | 5/1990 | Shekleton et al. | 60/804 |
| 4,928,481 A | * | 5/1990 | Joshi et al. | 60/737 |
| 4,938,020 A | * | 7/1990 | Shekleton et al. | 60/39.26 |
| 4,949,545 A | * | 8/1990 | Shekleton | 60/756 |
| 5,261,224 A | * | 11/1993 | Shekleton et al. | 60/804 |

(Continued)

*Primary Examiner* — Craig Kim
*Assistant Examiner* — Karthik Subramanian
(74) *Attorney, Agent, or Firm* — Michael W. Goltry; Robert A. Parsons; Parsons & Goltry

(57) ABSTRACT

A combustion device used in gas turbine engines to produce propulsion or rotate a shaft for power generation includes a can-annular combustor with a system of fuel and air inlet passages and nozzles that results in an optimal combustion environment of premixed fuel and air. The fuel-air inlets are placed at various longitudinal locations and circumferentially distributed, and direct the flow tangentially or nearly tangent to the can liner. The combustion device provides effective mixing of fuel and air, creates an environment for combustion that reduces pollutant emissions, reduces the need for costly pollution control devices, enhances ignition and flame stability, reduces piloting issues, and improves vibration reduction.

4 Claims, 5 Drawing Sheets

(56) References Cited

U.S. PATENT DOCUMENTS

| | | | |
|---|---|---|---|
| 5,628,182 A * | 5/1997 | Mowill | 60/804 |
| 5,727,378 A * | 3/1998 | Seymour | 60/804 |
| 5,746,048 A * | 5/1998 | Shah | 60/776 |
| 5,765,363 A * | 6/1998 | Mowill | 60/773 |
| 5,765,376 A * | 6/1998 | Zarzalis et al. | 60/748 |
| 5,966,926 A * | 10/1999 | Shekleton et al. | 60/39.094 |
| 6,189,314 B1 * | 2/2001 | Yamamoto et al. | 60/776 |
| 6,220,034 B1 * | 4/2001 | Mowill | 60/737 |
| 6,389,815 B1 * | 5/2002 | Hura et al. | 60/746 |
| 6,427,446 B1 * | 8/2002 | Kraft et al. | 60/737 |
| 6,925,809 B2 * | 8/2005 | Mowill | 60/737 |
| 7,523,603 B2 * | 4/2009 | Hagen et al. | 60/39.55 |
| 7,716,931 B2 * | 5/2010 | Mancini et al. | 60/748 |
| 8,739,511 B1 * | 6/2014 | Toqan et al. | 60/39.37 |
| 2003/0152880 A1 * | 8/2003 | Eroglu et al. | 431/8 |
| 2006/0101814 A1 * | 5/2006 | Saitoh et al. | 60/377 |
| 2006/0213203 A1 * | 9/2006 | Cooper | 60/804 |
| 2007/0006587 A1 * | 1/2007 | Ohta et al. | 60/746 |
| 2007/0125093 A1 * | 6/2007 | Burd et al. | 60/804 |
| 2007/0169484 A1 * | 7/2007 | Schumacher et al. | 60/754 |
| 2007/0199325 A1 * | 8/2007 | Tanimura et al. | 60/740 |
| 2007/0199326 A1 * | 8/2007 | Tanimura et al. | 60/740 |
| 2007/0199327 A1 * | 8/2007 | Tanimura et al. | 60/740 |
| 2007/0214790 A1 * | 9/2007 | Bland | 60/734 |
| 2008/0053097 A1 * | 3/2008 | Han et al. | 60/737 |
| 2008/0190112 A1 * | 8/2008 | Yoshida et al. | 60/737 |
| 2008/0190113 A1 * | 8/2008 | Yoshida et al. | 60/737 |
| 2008/0209909 A1 * | 9/2008 | Yoshida et al. | 60/737 |
| 2008/0245074 A1 * | 10/2008 | Oda et al. | 60/737 |
| 2008/0302105 A1 * | 12/2008 | Oda et al. | 60/737 |
| 2009/0019855 A1 * | 1/2009 | Venkataraman et al. | 60/738 |
| 2009/0031728 A1 * | 2/2009 | Miura et al. | 60/737 |
| 2009/0044537 A1 * | 2/2009 | Boardman et al. | 60/737 |

* cited by examiner

SECTION A-A

SECTION B-B

CAN-ANNULAR COMBUSTOR WITH PREMIXED TANGENTIAL FUEL-AIR NOZZLES FOR USE ON GAS TURBINE ENGINES

CROSS-REFERENCE TO RELATED APPLICATION

This application claims the benefit of U.S. Provisional Patent Application Ser. No. 61/175,544, filed May 5, 2009.

FIELD OF THE INVENTION

This invention relates to devices in gas turbine engines that aid in containing and producing the combustion of a fuel and air mixture. Such devices include but are not limited to fuel-air nozzles, combustor liners and casings and flow transition pieces that are used in military and commercial aircraft, power generation, and other gas turbine related applications.

BACKGROUND OF THE INVENTION

Gas turbine engines include machinery that extracts work from combustion gases flowing at very high temperatures, pressures and velocity. The extracted work can be used to drive a generator for power generation or for providing the required thrust for an aircraft. A typical gas turbine engine consists of a multistage compressor where the atmospheric air is compressed to high pressures. The compressed air is then mixed at a specified fuel/air ratio in a combustor wherein its temperature is increased. The high temperature and pressure combustion gases are then expanded through a turbine to extract work so as to provide the required thrust or drive a generator depending on the application. The turbine includes at least a single stage with each stage consisting of a row of blades and a row of vanes. The blades are circumferentially distributed on a rotating hub with the height of each blade covering the hot gas flow path. Each stage of non-rotating vanes is placed circumferentially, which also extends across the hot gas flow path. The included invention involves the combustor of gas turbine engines and components that introduce the fuel and air into the said device.

The combustor portion of a gas turbine engine can be of several different types: can/tubular, annular, and a combination of the two forming a can-annular combustor. It is in this component that the compressed fuel-air mixture passes through fuel-air swirlers and a combustion reaction of the mixture takes place, creating a hot gas flow causing it to drop in density and accelerate downstream. The can type combustor typically comprises of individual, circumferentially spaced cans that contain the flame of each nozzle separately. Flow from each can is then directed through a duct and combined in an annular transition piece before it enters the first stage vane. In the annular combustor type, fuel-air nozzles are typically distributed circumferentially and introduce the mixture into a single annular chamber where combustion takes place. Flow simply exits the downstream end of the annulus into the first stage turbine, without the need for a transition piece to combine the flow. The key difference of the last type, a can-annular combustor, is that it has individual cans encompassed by an annular casing that contains the air being fed into each can. Each variation has its benefits and disadvantages, depending on the application.

In combustors for gas turbines, it is typical for the fuel-air nozzle to introduce a swirl to the mixture for several reasons. One is to enhance mixing and thus combustion, another reason is that adding swirl stabilizes the flame to prevent flame blow out and it allows for leaner fuel-air mixtures for reduced emissions. A fuel air nozzle can take on different configurations such as single to multiple annular inlets with swirling vanes on each one.

As with other gas turbine components, implementation of cooling methods to prevent melting of the combustor material is needed. A typical method for cooling the combustor is effusion cooling, implemented by surrounding the combustion liner with an additional, offset liner, which between the two, compressor discharge air passes through and enters the hot gas flow path through dilution holes and cooling passages. This technique removes heat from the component as well as forms a thin boundary layer film of cool air between the liner and the combusting gases, preventing heat transfer to the liner. The dilution holes serve two purposes depending on its axial position on the liner: a dilution hole closer to the fuel-air nozzles will aid in the mixing of the gases to enhance combustion as well as provide unburned air for combustion, second, a hole that is placed closer to the turbine will cool the hot gas flow and can be designed to manipulate the combustor outlet temperature profile.

One can see that several methods and technologies can be incorporated into the design of combustors for gas turbine engines to improve combustion and lower emissions. While gas turbines tend to produce less pollution than other power generation methods, there is still room for improvement in this area. With government regulation of emissions tightening in several countries, the technology will need to improve to meet these requirements.

SUMMARY OF THE INVENTION

With regard to present invention, there is provided a novel and improved combustor design that is capable of operating in a typical fashion while minimizing the pollutant emissions that are a result of combustion of a fuel and air mixture and address other issues faced by such devices. The invention consists of a typical can-annular combustor with premixed fuel-air nozzles and/or dilution holes that introduce the compressor discharge air and pressurized fuel into the combustor at various locations in the longitudinal and circumferential directions. The original feature of the invention is that the fuel and air nozzles are placed in such a way as to create an environment with enhanced mixing of combustion reactants and products. Staging the premixed fuel and air nozzles to have more fuel upstream from another set of nozzles enhances the mixing of the combustion reactants and creates a specific oxygen concentration in the combustion region that greatly reduces the production of NOx. In addition, the introduction of compressor discharge air downstream of the combustion region allows for any CO produced during combustion to be burned/consumed before entering the first stage turbine. In effect, the combustor will improve gas turbine emission levels, thus reducing the need for emission control devices as well as minimize the environmental impact of such devices. In addition to this improvement, the tangentially firing fuel and fuel-air nozzles directs its flames to the adjacent burner nozzles in each can, greatly enhancing the ignition process of the combustor.

BRIEF DESCRIPTION OF THE DRAWINGS

Referring to the drawings.

DETAILED DESCRIPTION

Figure 1:
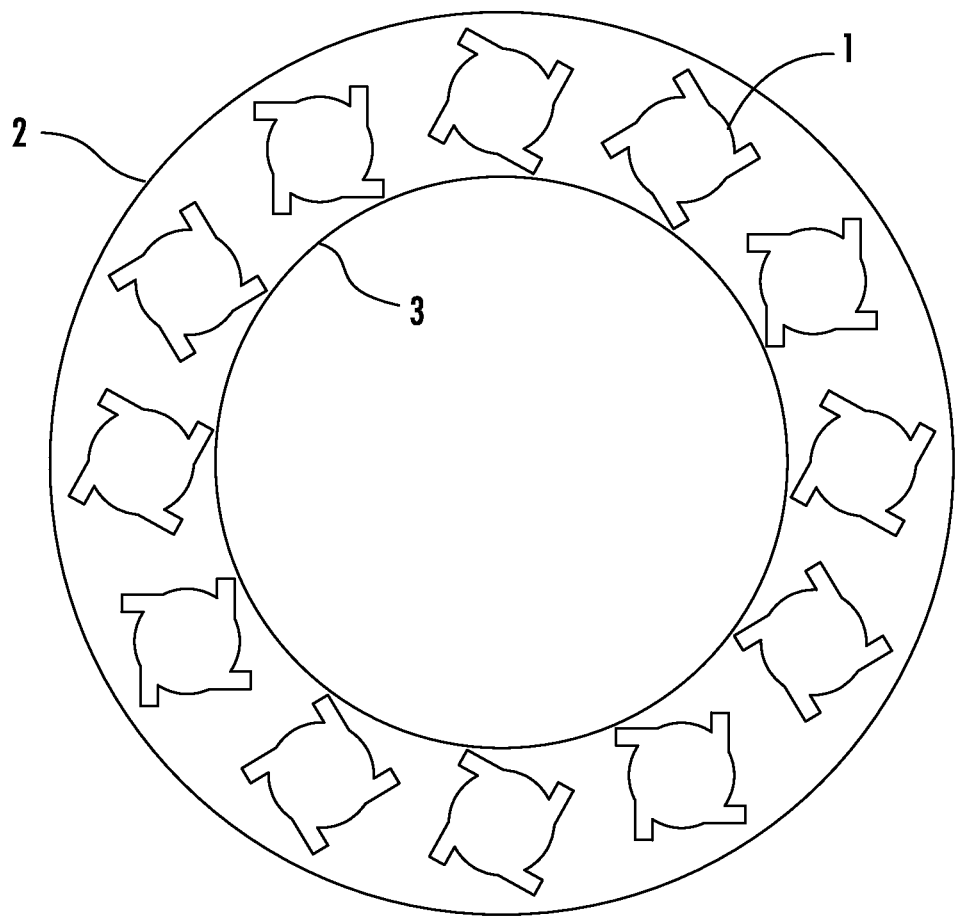
FIG. 1 is a two-dimensional sketch showing the can-annular arrangement with the nozzles that attach to the outer can liner injecting fuel and air into a common plane.
Figure 2:
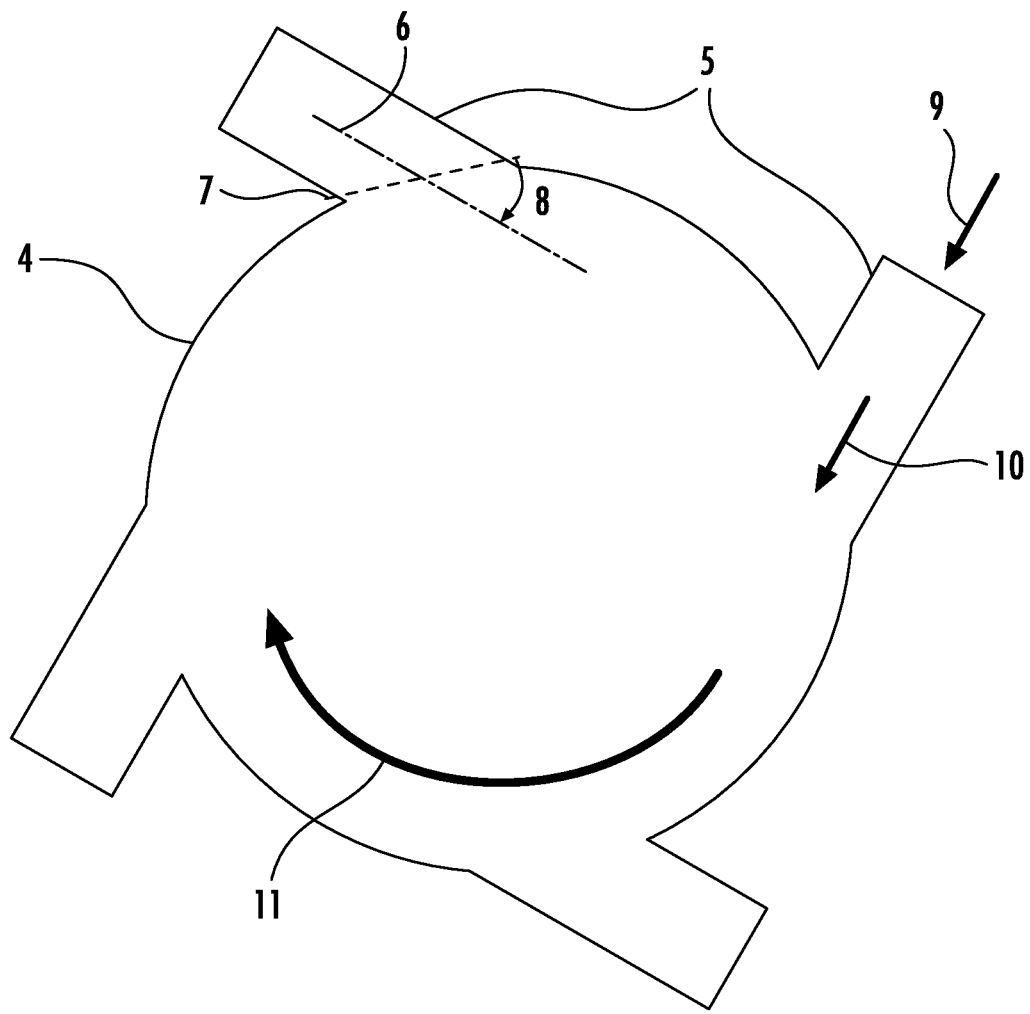
FIG. 2 is a two-dimensional sketch showing the general idea of the tangential nozzles applied to the can in a can-annular combustor.

FIG. 1 shows an example of the general arrangement of a can-annular combustor with the can 1 spaced circumferentially on a common radius, all cans of which are enclosed in an annular space between a cylindrical outer liner 2 and a cylindrical inner liner 3. The FIG. also shows the tangential nozzle arrangement of the cans. FIG. 2 shows the can in more detail. A can liner 4 forms the can volume, with fuel-air nozzles 5 injecting a premixed fuel and air mixture. The nozzles form an angle 8 between the nozzle centerline 6 and a line tangent to the can liner 4 that intersections with the nozzle centerline 6. This angle defines the circumferential direction of the nozzles.

FIG. 2 also shows the general operation of the can in the example can-annular combustor configuration, where a premixed fuel-air mixture 9 is injected into the cans 1 at an angle 8. A flame 10 forms and travels through the can in a path 11 that follows the can liner. These tangentially directed nozzles result in flames from each nozzle interacting with the downstream and adjacent nozzle. This key feature enhances ignition and reduces the need of piloting burner nozzles by allowing the flame from a nozzle to ignite the fuel at the adjacent and downstream nozzle.

Figure 3:
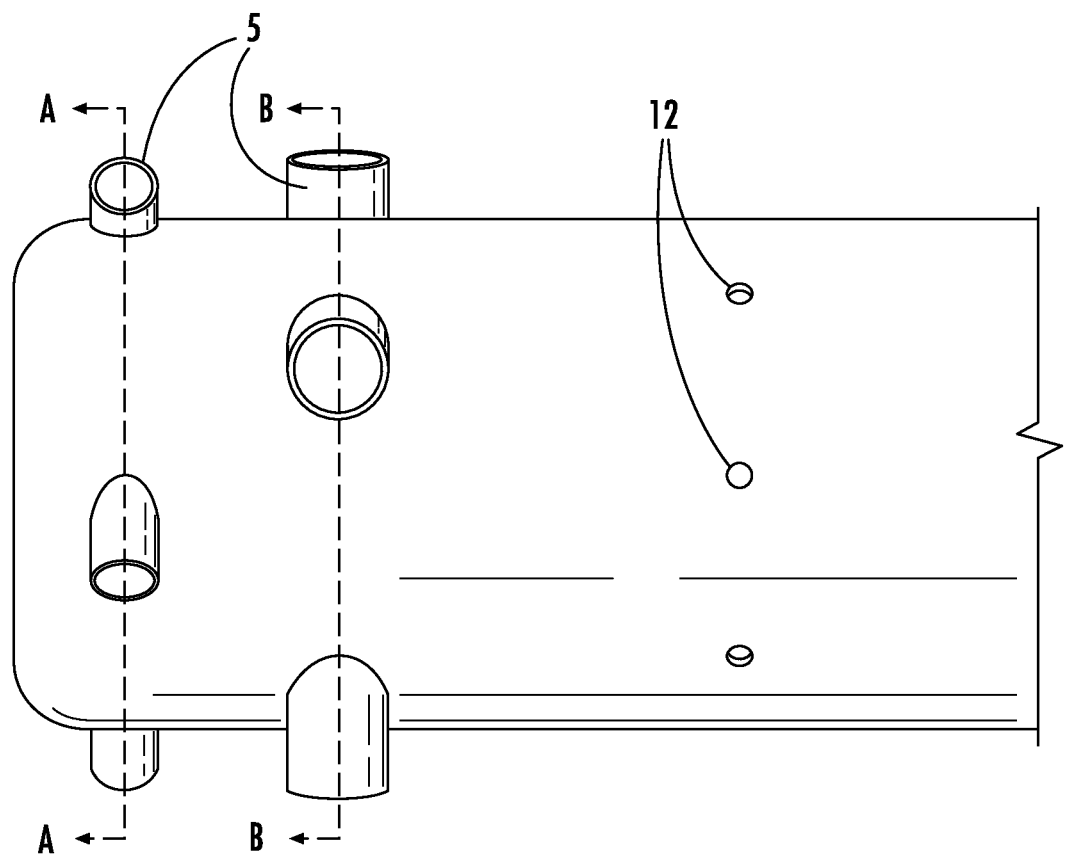
FIG. 3 is an isometric side view of the upstream portion of an example configuration of the said invention.

FIG. 3 shows the beginning or upstream portion of an example can with the downstream portion excluded. The said invention will have a plurality of nozzle rows that are spaced along the longitudinal direction of the can. Each row of nozzles may have at least one nozzle and can be offset by a circumferential angle from adjacent nozzle rows. The can may also have several rows of circumferentially spaced holes 12 or passages for cooling air to enter the can at any location.

Figure 4A:
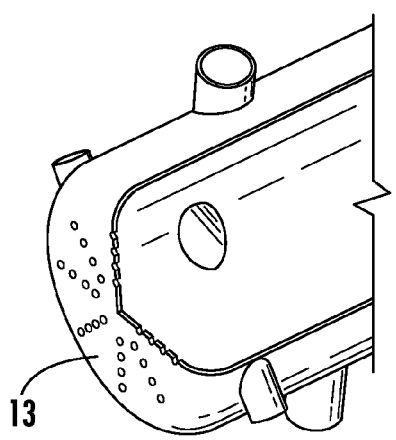
FIG. 4A is an isometric cutaway view of the invention.
Figure 4B:
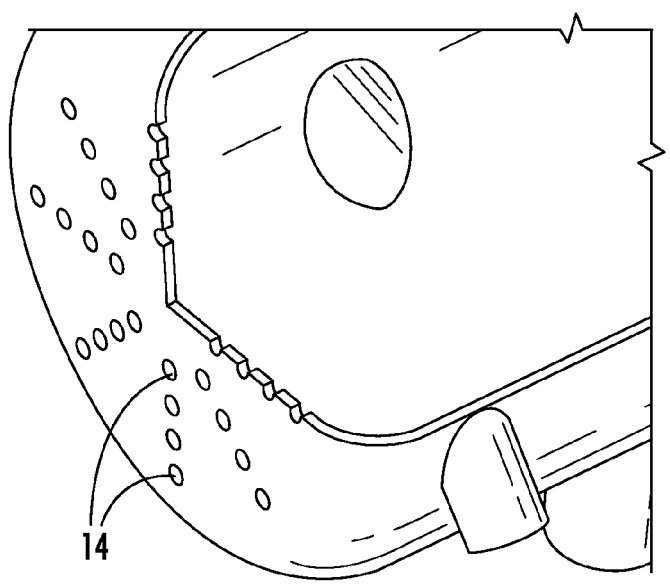
FIG. 4B is a close up view of the image from FIG. 4A.
Figure 5:
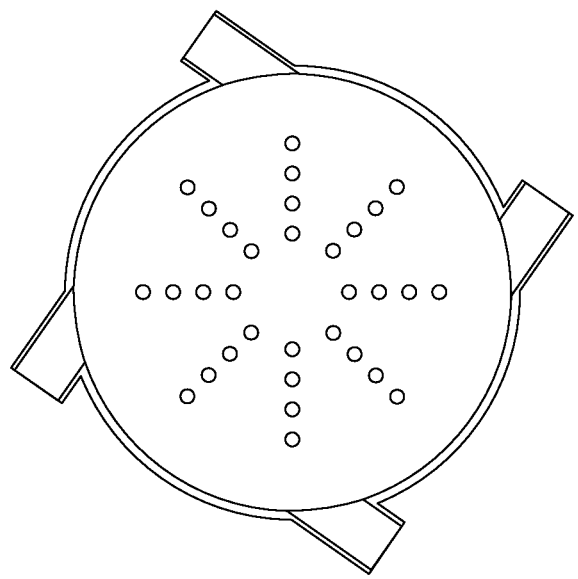
FIG. 5 is a section view showing section A-A as defined in FIG. 3.
Figure 6:
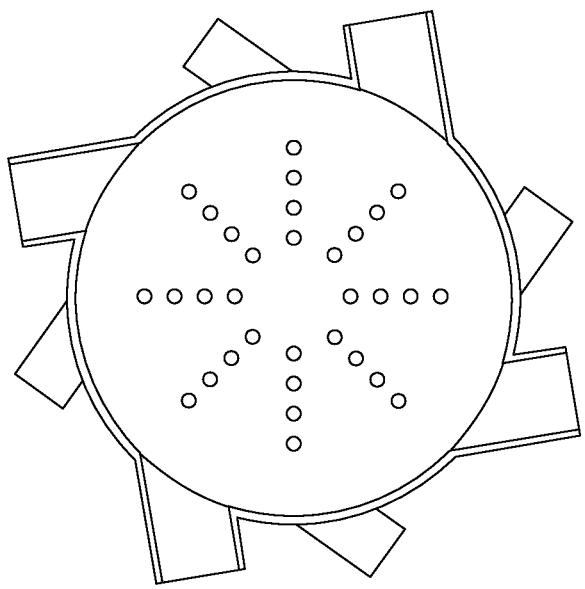
FIG. 6 is a section view showing section B-B as defined in FIG. 3.

FIGS. 4A and 4B show the most upstream face 13 of the can, which may have holes 14 similar to dilution holes that allow compressor discharge air to enter the can. FIGS. 5 and 6 show how nozzles from each set of rows may be offset by a circumferential angle. The different rows of nozzles allows for the injection of the fuel-air mixture near the front wall, which may have a higher fuel/air ratio than the second set of nozzles in conjunction with the mixture that is injected downstream of the fuel nozzles 5, to create the desired mixing and fuel-air staging effect that will create an optimal combustion environment that reduces NOx and CO emissions from the combustor.

The present invention is described above with reference to a preferred embodiment. However, those skilled in the art will recognize that changes and modifications may be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A method of mixing combustion reactants for combustion for a gas turbine engine comprising the steps of:

providing a can annular combustor, the can annular combustor includes an outer liner enclosing a plurality of circumferentially spaced cans enclosed between two cylindrical liners, each of the plurality of circumferentially spaced cans define separate combustion zones and each of the plurality of circumferentially spaced cans has a can liner, the can liner of each of the plurality of circumferentially spaced cans has an upstream end, including a front wall, and a downstream end, the combustion zone of each of the plurality of circumferentially spaced cans has a can volume of the can liner of each of the plurality of circumferentially spaced cans, the can volume of each of the plurality of circumferentially spaced cans extends in a longitudinal direction from the front wall of the upstream end of the can liner to the downstream end of the can liner of each of the plurality of circumferentially spaced cans, a plurality of dilution holes through the front wall of each of the plurality of circumferentially spaced cans, first nozzles through the can liner of each of the plurality of circumferentially spaced cans, second nozzles through the can liner of each of the plurality of circumferentially spaced cans, the first nozzles of each of the plurality of circumferentially spaced cans are spaced apart and are arranged circumferentially around the combustion zone between the front wall and the downstream end of the can liner of each of the plurality of circumferentially spaced cans, the second nozzles of each of the plurality of circumferentially spaced cans are spaced apart and are arranged circumferentially around the combustion zone between the front wall and the first nozzles of each of the plurality of circumferentially spaced cans, the first nozzles are downstream of the second nozzles toward the downstream end of the can liner and reside in a first plane that is normal to the longitudinal direction of the can volume of each of the plurality of circumferentially spaced cans, and the second nozzles are upstream of the first nozzles toward the upstream end of the can liner and reside in a second plane that is normal to the longitudinal direction of the can volume of each of the plurality of circumferentially spaced cans and for each of the cans concurrently:

injecting a first premixed fuel-air mixture into the can volume through all of the first nozzles with a first fuel-air ratio, the first nozzles each applying the first premixed fuel-air mixture into the annular volume in a direction that is angularly offset from a tangent line relative to the can liner of each of the plurality of circumferentially spaced cans;

injecting a second premixed fuel-air mixture into the can volume through all of the second nozzles with a second fuel-air ratio, wherein the second fuel-air ratio is greater than the first fuel-air ratio, the second nozzles each applying the second premixed fuel-air mixture into the can volume in the direction that is angularly offset from the tangent line relative to the can liner of each of the plurality of circumferentially spaced cans; and injecting compressor discharge air through the plurality of dilution holes through the front wall into the can volume in the longitudinal direction of the can volume of each of the plurality of circumferentially spaced cans; the concurrent steps of injecting the first premixed fuel-air mixture into the can volume through all of the first nozzles, injecting the second premixed fuel-air mixture into the can volume through all of the second nozzles, and injecting compressor discharge air through the plurality of dilution holes through the front wall into the can volume of each of the plurality of circumferentially spaced cans creating fuel-air staging for enhancing combustion and reducing NOx and CO emissions.

2. The method as claimed in claim 1, further comprising the steps of providing circumferentially spaced cooling air holes through the can liner between the downstream end of the can liner and the first nozzles, and circumferentially applying cooling air through the circumferentially spaced cooling air holes into the can volume between the downstream end of the can volume and the first nozzles, for each of the cans.

3. The method as claimed in claim 1, each first directing any flame to an adjacent first nozzle for enhancing combustion, and each second for directing any flame to an adjacent second nozzle another for enhancing combustion.

4. The method as claimed in claim 1, wherein the first nozzles are circumferentially offset relative to the second nozzles.

\* \* \* \* \*